United States Patent Office 3,201,453
Patented Aug. 17, 1965

3,201,453
NITROSOCHLORIDE AND CHLORO OXIME DERIVATIVES OF POLYUNSATURATED ORGANIC COMPOUNDS
David T. Manning and Harry A. Stansbury, Jr., South Charleston, W. Va., assignors to Union Carbide Corporation, a corporation of New York
No Drawing. Filed May 18, 1961, Ser. No. 110,885
5 Claims. (Cl. 260—468)

The invention relates to novel nitrosochloride and chloro oxime derivatives of certain polyunsaturated organic compounds, which are fully described hereinbelow, and to the novel processes for their preparation.

It has been known that nitrosyl chloride will add to certain activated olefinic double bonds, producing thereby the corresponding nitrosochloride which can be rearranged to the chloro oxime. However, attempts to add nitrosyl chloride to compounds having two or more olefinic double bonds have produced addition, if at all, to only one of the double bonds. The present invention is based upon the discovery that certain polyunsaturated organic compounds react with nitrosyl chloride so as to add this reagent to all of the olefinic double bonds present in the polyunsaturated organic compound.

The novel process for preparing the nitrosochloride derivatives of the invention comprises reacting nitrosyl chloride with an organic compound having at least two olefinic double bonds, wherein each of said olefinic double bonds is contained in a radical which is represented by the structural formula

for a period of time sufficient to add said nitrosyl chloride to each of the olefinic double bonds contained in said organic compound. The nitrosochloride adducts so produced, and their chloro oxime rearrangement products, comprise the novel compositions of the invention.

Included among the organic compounds having at least two olefinic double bonds which are employed in the process of the invention are those organic compounds which contain two bicyclo[2.2.1]-5-hepten-2-yl radicals, and which are represented by Formula I:

(I)
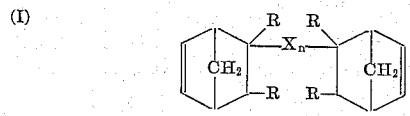

wherein each R individually can be hydrogen, alkyl, aryl, alkaryl or aralkyl; X is a divalent organic radical, and $n$ is an integer having a value of from zero to one. The two bicyclo[2.2.1]-5-hepten-2-yl radicals can either be directly bonded to one another (i.e., when $n$ in Formula I is zero) or can be joined by a divalent organic radical, represented by X in Formula I. X can represent any divalent radical that contains no groups which are reactive to nitrosyl chloride under the conditions employed in the process of the invention, and particularly contains no olefinic unsaturation.

Exemplary of the many divalent organic radicals contemplated are thio, alkylene, thiodialkyl, alkyleneoxycarbonyl, sulfonyl, sulfonyldialkyl, oxalylbisoxyalkyl, alkylenebis(carbonyloxyalkyl), alkylenebis(oxycarbonyl), terephthaloylbis(oxyalkyl), alkylenebis(oxycarbonylalkyl), carbonyldialkyl, thiocarbonyldialkyl, carbonylthio, carbonylthiodialkyl, dithio, sulfinyl, p-phenylenebis(oxycarbonyl), oxybis[poly(alkyleneoxy)carbonyl], and the like. In the practice of the invention, it is desirable that said divalent organic radicals have a molecular weight of below about 200, and preferably below about 150.

The variables in Formula I that are designated as R can be such radicals as hydrogen, methyl, ethyl, propyl, butyl, phenyl, benzyl, tolyl, xylyl, and the like, and thus can be either hydrogen or hydrocarbon radicals having from one to eight carbon atoms.

The following compounds are illustrative of organic compounds having two bicyclo[2.2.1]-5-hepten-2-yl radicals which are employed in the invention:

bi(bicyclo[2.2.1]-5-hepten-2-yl),
bicyclo[2.2.1]-5-heptene-2-methyl bicyclo[2.2.1]-5-heptene-2-carboxylate,
1,2-di(bicyclo[2.2.1]-5-hepten-2-yl)ethane,
di(bicyclo[2.2.1]-5-hepten-2-yl) sulfone,
di(bicyclo[2.2.1]-5-heptene-2-methyl) adipate,
ethylene di(3-methylbicyclo[2.2.1]-5-heptene-2-carboxylate),
2-ethyl-3-methylbicyclo[2.2.1]-5-heptene-2'-methyl 2-ethyl-3-methylbicyclo[2.2.1]-5-heptene-2'-carboxylate,
3-phenylbicyclo[2.2.1]-5-heptene-2-methyl 3-phenylbicyclo[2.2.1]-5-heptene-2-carboxylate,
di(bicyclo[2.2.1]-5-heptene-2-methyl) oxalate,
di(bicyclo[2.2.1]-5-heptene-2-methyl) terephthalate,
p-phenylene di(2-methylbicyclo[2.2.1]-5-heptene-2'-carboxylate)
diethylene glycol di(bicyclo[2.2.1]-5-heptene-2-carboxylate),
di(bicyclo[2.2.1]-5-heptene-2-methyl) ketone,
bicyclo[2.2.1]-5-hepten-2-yl bicyclo[2.2.1]-5-heptene-2-carbothiolate,
di(bicyclo[2.2.1]-5-heptene-2-methyl) thione,
bicyclo[2.2.1]-5-heptene-2-methyl (bicyclo[2.2.1]-5-heptene-2-)thiolacetate,
di(bicyclo[2.2.1]-5-hepten-2-yl) disulfide,
di(bicyclo[2.2.1]-5-hepten-2-yl) sulfoxide,
di(bicyclo[2.2.1]-5-hepten-2-yl) sulfide,
ethylene di[(bicyclo[2.2.1]-5-hepten-2-)acetate],
2-phenylbicyclo[2.2.1]-5-heptene-2'-methyl 2-phenylbicyclo[2.2.1]-5-heptene-2'-carboxylate,
di(3-propylbicyclo[2.2.1]-5-heptene-2-)methyl sulfone,
di(3-butylbicyclo[2.2.1]-5-heptene-2-)methyl sulfide,
di(3-benzylbicyclo[2.2.1]-5-heptene-2-)methyl succinate,
di-2-(3-O-tolylbicyclo[2.2.1]-5-heptene-2-)ethyl ether,
2-methyl-3-ethylbicyclo[2.2.1]-5-heptene-2'-methyl 2-methyl-3-ethylbicyclo[2.2.1]-5-heptene-2'-carboxylate, and the like.

The preferred organic compounds having two bicyclo[2.2.1]-5-hepten-2-yl radicals are those in which said radicals are interconnected by an ester or by a sulfonyl group, such as bicyclo[2.2.1]-5-heptene-2-methyl bicyclo[2.2.1]-5-heptene-2-carboxylate and di(bicyclo[2.2.1]-5-hepten-2-yl) sulfone.

The preparation of the organic compounds having two bicyclo[2.2.1]-5-hepten-2-yl radicals can be by known methods. For example, bicyclo[2.2.1] - 5 - heptene - 2 - methyl bicyclo[2.2.1]-5-heptene-2-carboxylate can be prepared by the following sequence of reactions:

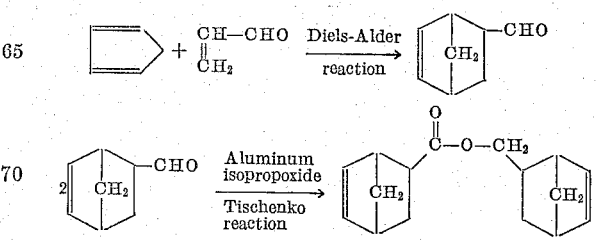

Di(bicyclo[2.2.1]-5-hepten-2-yl) sulfone can be prepared by the following sequence of reactions:

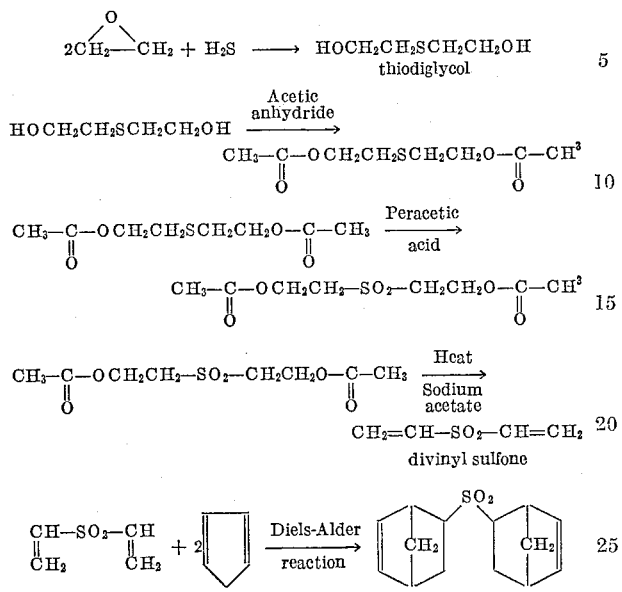

Ethylene di(3-methylbicyclo[2.2.1]-5-heptene-2-carboxylate) can be prepared by the following sequence of reactions:

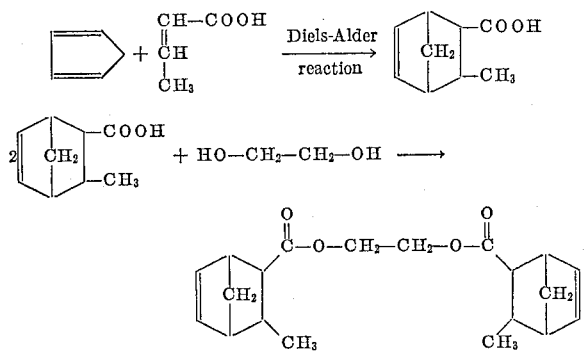

Other organic compounds having two bicyclo[2.2.1]-5-hepten-2-yl groups can be prepared by methods which are analogous to the three methods exemplified above.

Another class of organic compounds which are readily employed in the process of the invention are the tetracyclo-[6.2.1$^{1,8}$.1$^{3,6}$.0$^{2,7}$]-4,9-dodecadienes which are represented by structural Formula II:

(II) 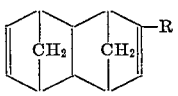

wherein R is either hydrogen or an alkyl, alkaryl, aralkyl or aryl radical having from one to eight carbon atoms. These compounds can be prepared by the following sequence of reactions, in which R is as defined above:

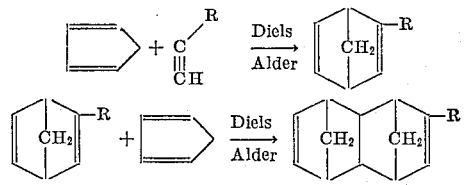

Examples of the tetracyclo[6.2.1$^{1,8}$.1$^{3,6}$.0$^{2,7}$]-4,9-dodecadienes which can be employed are Tetracyclo[6.2.1$^{1,8}$.1$^{3,6}$.0$^{2,7}$]-4,9-dodecadiene,
4-methyltetracyclo[6.2.1$^{1,8}$.1$^{3,6}$.0$^{2,7}$]-4,9-dodecadiene,
4-ethyltetracyclo[6.2.1$^{1,8}$.1$^{3,6}$.0$^{2,7}$]-4,9-dodecadiene,
4-phenyltetracyclo[6.2.1$^{1,8}$.1$^{3,6}$.0$^{2,7}$]-4,9-dodecadiene,
4-tolyltetracyclo[6.2.1$^{1,8}$.1$^{3,6}$.0$^{2,7}$]-4,9-dodecadiene,
4-xylyltetracyclo[6.2.1$^{1,8}$.1$^{3,6}$.0$^{2,7}$]-4,9-dodecadiene,
4-propyltetracyclo[6.2.1$^{1,8}$.1$^{3,6}$.0$^{2,7}$]-4,9-dodecadiene,
4-pentyltetracyclo[6.2.1$^{1,8}$.1$^{3,6}$.0$^{2,7}$]-4,9-dodecadiene,
4-heptyltetracyclo[6.2.1$^{1,8}$.1$^{3,6}$.0$^{2,7}$]-4,9-dodecadiene,
4-octyltetracyclo[6.2.1$^{1,8}$.1$^{3,6}$.0$^{2,7}$]-4,9-dodecadiene,
4-benzyltetracyclo[6.2.1$^{1,8}$.1$^{3,6}$.0$^{2,7}$]-4,9-dodecadiene, and the like.

Other organic compounds having at least two olefinic double bonds which can be employed in the invention include glycerol tribicyclo[2.2.1]-5-heptene-2-carboxylate, pentaerythritol tetra(bicyclo[2.2.1]-5-heptene-2-carboxylate), tri(bicyclo[2.2.1]-5-heptene-2-methyl) 1,3,5-benzenetricarboxylate, and the like.

The process of the invention comprises reacting nitrosyl chloride with an organic compound having at least two olefinic double bonds as described hereinabove, for a period of time sufficient to add said nitrosyl chloride to each of the said olefinic double bonds contained in said organic compound, and producing thereby the corresponding polynitrosochloride.

The ratio of the reactants can vary over a wide range, for example, from about 0.1 to about 2.5 moles, or higher, of nitrosyl chloride per mole of the said organic compound having at least two olefinic double bonds. The preferred ratio of reactants is from about 2 to about 2.1 moles of nitrosyl chloride per mole of the said organic compound.

The reaction temperature can vary from about −70° C. to about +30° C. The preferred temperature range is from about −10° C. to about +10° C.

The reaction time is determined, in part, by a variety of factors, such as nature, proportion, and mass of reactants, reaction temperature, and the like. The reaction is preferably carried out by adding the nitrosyl chloride to the above-described organic compound having at least two olefinic double bonds at a rate which is consistent with maintaining the exothermic reaction at the desired temperature. For example, a feed rate of from about 0.02 to about 0.1 mole of nitrosyl chloride per minute per mole of said organic compound at a reaction temperature of about −10° C. to about +10° C. is suitable. Higher or lower feed rates can be employed at the above-stated reaction temperatures or other reaction temperatures, depending on the ability of the equipment to maintain the desired temperature. In general, however, the feed rate will be from about 0.005 to about 0.5 mole of nitrosyl chloride per minute per mole of said organic compound.

It is frequently desirable to carry out the process of the invention in an inert, normally-liquid organic vehicle which serves as a solvent and a diluent for the reactants. Compositions which can be employed for this purpose include hydrocarbons such as pentane, hexane, heptane, cyclopentane, benzene, toluene, xylene, ligroin, and the like; ethers such as diethyl ether, diisopropyl ether, and the like; halogenated hydrocarbons such as chloroform, methylene dichloride, carbon tetrachloride, ethylene dichloride, and the like; various oxygenated solvents such as dioxane, tetrahydrofuran, and the like. The proportion of reactants in the organic vehicle is not critical, and can vary from about 5 weight percent to about 50 weight percent, based on the total solution weight. The preferred organic vehicles are the hydrocarbons, with pentane being most preferred.

Glass or glass-lined equipment should preferably be employed to carry out the addition of nitrosyl chloride to the olefins. For example, a glass-lined reaction kettle equipped with agitator and means for heating or cooling as desired is suitable. The equipment is preferably constructed from glass or is glass-lined in order to avoid corrosion by the nitrosyl chloride.

The reaction is normally carried out as a batch process, although continuous or semi-continuous processes can be employed if desired. The reaction is preferably carried out at atmospheric pressure, although sub-atmospheric or super-atmospheric pressures can be employed, if desired.

The nitrosochloride derivatives of the above-described organic compounds having at least two olefinic double bonds, which are the novel products of the inventive process, precipitate out of solution as formed. These nitrosochloride derivatives can then be recovered by standard methods, such as by filtering and washing, with subsequent drying of the precipitate.

The nitrosochloride products of the invention are produced in the form of dimers. It is believed that the dimerization is a result of interaction between two nitroso groups to produce a diazoxy group, according to the reaction:

$$-NO + ON- \longrightarrow -\overset{\overset{O}{\uparrow}}{N}=\overset{\overset{O}{\uparrow}}{N}-$$

Among the novel nitrosochlorides contemplated by the invention are those derived from organic compounds having two bicyclo[2.2.1]-5-hepten-2-yl radicals, which are represented by Formula III:

(III)
$$\left[ \begin{array}{c} ON-\overset{R\quad R}{\underset{CH_2}{\diagup\diagdown}}-X_n-\overset{}{\underset{R\quad R}{\diagup\diagdown}}\overset{CH_2}{\diagdown\diagup}-NO \\ Cl- \qquad \qquad \qquad \qquad \qquad -Cl \end{array} \right]_2$$

wherein R, X, and $n$ are as described above with respect to Formula I.

These novel nitrosochloride products of the invention are exemplified by compounds such as:

bi(bicyclo[2.2.1]-5-hepten-2-yl) dinitrosochloride,
bicyclo[2.2.1]-5-heptene-2-methyl bicyclo[2.2.1]-5-heptene-2-carboxylate dinitrosochloride,
1,2-di(bicyclo[2.2.1]-5-hepten-2-yl)ethane dinitrosochloride,
di(bicyclo[2.2.1]-5-hepten-2-yl) sulfone dinitrosochloride,
di(bicyclo[2.2.1]-5-heptene-2-methyl) adipate dinitrosochloride,
ethylene di(3-methylbicyclo[2.2.1]-5-heptene-2-carboxylate) dinitrosochloride,
2-ethyl-3-methylbicyclo[2.2.1]-5-heptene-2'-methyl 2-ethyl-3-methylbicyclo[2.2.1]-5-heptene-2'-carboxylate dinitrosochloride,
3-phenylbicyclo[2.2.1]-5-heptene-2-methyl 3-phenylbicyclo[2.2.1]-5-heptene-2-carboxylate dinitrosochloride,
di(bicyclo[2.2.1]-5-heptene-2-methyl) oxalate dinitrosochloride,
di(bicyclo[2.2.1]-5-heptene-2-methyl) terephthalate dinitrosochloride,
p-phenylene di(2-methylbicyclo[2.2.1]-5-heptene-2'-carboxylate) dinitrosochloride,
diethylene glycol di(bicyclo[2.2.1]-5-heptene-2-carboxylate) dinitrosochloride,
di(bicyclo[2.2.1]-5-heptene-2-methyl) ketone dinitrosochloride,
bicyclo[2.2.1]-5-hepten-2-yl bicyclo[2.2.1]-5-heptene-2-carbothiolate dinitroscochloride,
di(bicyclo[2.2.1]-5-heptene-2-methyl) thione dinitroscochloride,
bicyclo[2.2.1]-5-heptene-2-methyl (bicyclo[2.2.1]-5-heptene-2-)thiolacetate dinitrosochloride,
di(bicyclo[2.2.1]-5-hepten-2-yl) disulfide dinitrosochloride,
di(bicyclo[2.2.1]-5-hepten-2-yl) sulfoxide dinitrosochloride,
di(bicyclo[2.2.1]-5-hepten-2-yl) sulfide dinitrosochloride,
ethylene di[(bicyclo[2.2.1]-5-heptene-2-)acetate] dinitrosochloride,
2-phenylbicyclo[2,2,1]-5-heptene-2'-methyl 2-phenylbicyclo[2.2.1]-5-heptene-2'-carboxylate dinitrosochloride,
di(3-propylbicyclo[2.2.1]-5-heptene-2-)methyl sulfone dinitrosochloride,
di(3-butylbicyclo[2.2.1]-5-heptene-2)methyl sulfide dinitrosochloride,
di(3-benzylbicyclo[2.2.1]-5-heptene-2-)methyl succinate dinitrosochloride,
di-2-(3-O-tolylbicyclo[2.2.1]-5-heptene-2-)ethyl ether dinitrosochloride,
2-methyl-3-ethylbicyclo[2.2.1]-5-heptene-2'-methyl 2-methyl-3-ethylbicyclo[2.2.1]-5-heptene-2'-carboxylate dinitrosochloride,
and the like A second class of novel nitrosochloride products of the invention are those derived from the tetracyclo-[6.2.1$^{1,8}$.1$^{3,6}$.0$^{2,7}$]-4,9-dodecadienes. These compounds are represented by Formula IV:

(IV)
$$\left[ \begin{array}{c} Cl-\overset{}{\underset{CH_2}{\diagup\diagdown}}\overset{}{\underset{CH_2}{\diagdown\diagup}}-\overset{R}{\underset{}{\diagup\diagdown}}-Cl \\ NO- \qquad \qquad \qquad \qquad -NO \end{array} \right]_2$$

wherein R is hydrogen or an alkyl or aryl radical having from one to eight carbon atoms.

Exemplary of the novel tetracyclo[6.2.1$^{1,8}$.1$^{3,6}$.0$^{2,7}$]-4,9-dodecadiene dinitrosochlorides which are provided by the invention are the following compounds:

Tetracyclo[6.2.1$^{1,8}$.1$^{3,6}$.0$^{2,7}$]-4,9-dodecadiene dinitrosochloride,
4-methyltetracyclo[6.2.1$^{1,8}$.1$^{3,6}$.0$^{2,7}$]-4,9-dodecadiene dinitrosochloride,
4-ethyltetracyclo[6.2.1$^{1,8}$.1$^{3,6}$.0$^{2,7}$]-4,9-dodecadiene dinitrosochloride,
4-phenyltetracyclo[6.2.1$^{1,8}$.1$^{3,6}$.0$^{2,7}$]-4,9-dodecadiene dinitrosochloride,
4-tolyltetracyclo[6.2.1$^{1,8}$.1$^{3,6}$.0$^{2,7}$]-4,9-dodecadiene dinitrosochloride,
4-xylyltetracyclo[6.2.1$^{1,8}$.1$^{3,6}$.0$^{2,7}$]-4,9-dodecadiene dinitrosochloride,
4-propyltetracyclo[6.2.1$^{1,8}$.1$^{3,6}$.0$^{2,7}$]-4,9-dodecadiene dinitrosochloride,
4-pentyltetracyclo[6.2.1$^{1,8}$.1$^{3,6}$.0$^{2,7}$]-4,9-dodecadiene dinitrosochloride,
4-heptyltetracyclo[6.2.1$^{1,8}$.1$^{3,6}$.0$^{2,7}$]-4,9-dodecadiene dinitrosochloride,
4-octyltetracyclo[6.2.1$^{1,8}$.1$^{3,6}$.0$^{2,7}$]4,9-dodecadiene dinitrosochloride,
4-benzyltetracyclo[6.2.1$^{1,8}$.1$^{3,6}$.0$^{2,7}$]-4,9-dodecadiene dinitrosochloride, and the like.

Also included within the novel nitrosochloride products of the invention are glycerol tri(bicyclo[2.2.1]-5-heptene-2-carboxylate) trinitrosochloride, pentaerythritol tetra-(bicyclo[2.2.1]-5-heptene-2-carboxylate) tetranitrosochloride, tri(bicyclo[2.2.1]-5-heptene-2-methyl) 1,3,5-benzenetricarboxylate trinitrosochloride, and the like.

The preferred dinitrosochlorides are bicyclo[2.2.1]-5-heptene-2-methyl bicyclo[2.2.1]-5-heptene-2-carboxylate dinitrosochloride, di(bicyclo[2.2.1]-5-hepten-2-yl) sulfone dinitrosochloride, and tetracyclo[6.2.1$^{1,8}$.1$^{3,6}$.0$^{2,7}$]-4,9-dodecadiene dinitrosochloride.

When heated, the nitrosochloride products of the invention rearrange to produce the chloro oximes, which are also contemplated by the invention. The rearrangement reaction is illustrated by the following sequence of reactions:

$$\left[ \begin{array}{c} \diagdown\diagup Cl \\ CH \\ | \\ CH-NO \\ \diagup\diagdown \end{array} \right]_2 \underset{\rightleftarrows}{\overset{heat}{}} 2 \begin{array}{c} \diagdown\diagup Cl \\ CH \\ | \\ CH \\ | \\ NO \\ \diagup\diagdown \end{array} \longrightarrow 2 \begin{array}{c} \diagdown\diagup Cl \\ CH \\ | \\ C=NOH \\ \diagup \end{array}$$

The first step in the rearrangement is the dissociation of the stable dinitrosochloride dimer to the unstable monomeric form. This occurs at temperatures above about 95° C., and preferably above about 105° C. The monomer then rapidly rearranges to the chloro oxime.

It is preferable to carry out the rearrangement in an inert organic vehicle that is liquid at the reaction temperature. Compounds such as n-butanol, amyl alcohol, various mono-alkyl and di-alkyl ethers of ethylene and propylene glycol, N,N'-dimethylformamide, and the like can be employed as the inert organic vehicle. N,N'-dimethylformamide is preferred.

The weight ratio of organic vehicle to starting nitrosochloride is not critical and can vary over a wide range, for example, from about 3:1 to about 15:1.

The rearrangement is carried out at a temperature in the range of from about 95° C. to about 150° C., preferably from about 150° C. to about 130° C., and most preferably from about 110° C. to about 120° C.

The reaction time is dependent, in part, upon such factors as reaction temperature, nature of the particular nitrosochloride, concentration in the organic vehicle, and the like. The reaction time can vary from about two minutes to about two hours, and preferably from about five to about thirty minutes.

The rearrangement reaction is preferably carried out at atmospheric pressure, however, sub- or super-atmospheric pressure can be employed, depending upon the boiling point of the particular organic vehicle employed, since one convenient way to maintain the desired reaction temperature is by refluxing the organic vehicle.

The chloro oxime product can be recovered by standard methods, such as by distilling off the organic vehicle, followed by dissolving the residue from the distillation in an inert organic solvent such as diethyl ether. The resulting solution is then diluted with a hydrocarbon such as pentane, in order to precipitate any impurities which might be present. After filtering, the filtrate is then evaporated to yield the solid chloro oxime product.

Standard reaction equipment can be employed for the rearrangement reaction. For example, a reaction vessel equipped with agitator, means for refluxing, and means for heating or cooling as desired, is suitable. The equipment can be any of the standard materials, such as glass, stainless steel, copper, Monel, aluminum and the like.

Included among the chloro oximes which are within the scope of the invention are those derived from organic compounds having two bicyclo[2.2.1]-5-hepten-2-yl radicals, which are represented by Formula V:

(V) 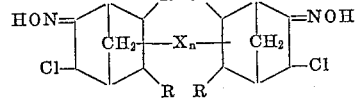

wherein R, X, and $n$ are as defined above with respect to Formula I.

Exemplary of these dichloro dioxime derivatives of organic compounds having two bicyclo[2.2.1]-5-hepten-2-yl radicals are the following compounds:

bi(5-chloro-6-hydroxyiminobicyclo[2.2.1]hepten-2(3)-yl),
5-chloro-6-hydroxyiminobicyclo[2.2.1]heptane-2(3)-methyl 5-chloro-6-hydroxyiminobicyclo[2.2.1]heptane-2(3)-carboxylate,
1,2-di(5-chloro-6-hydroxyiminobicyclo[2.2.1]heptan-2(3)-yl)ethane,
di(5-chloro-6-hydroxyiminobicyclo[2.2.1]heptan-2(3)-yl) sulfone,
di(5-chloro-6-hydroxyiminobicyclo[2.2.1]heptane-2(3)-methyl) adipate,
ethylene di(5-chloro-6-hydroxyimino-3(2)-methyl-bicyclo[2.2.1]heptane-2(3)-carboxylate),
5-chloro-6-hydroxyimino-2(3)-ethyl-3(2)-methyl-bicyclo[2.2.1]heptane-2'(3')-methyl 5-chloro-6-hydroxyimino-2(3)-ethyl-3(2)-methylbicyclo[2.2.1]-heptane-2'(3')-carboxylate,
5-chloro-6-hydroxyimino-3(2)-phenyl-bicyclo[2.2.1]-heptane-2(3)-methyl 5-chloro-6-hydroxyimino-3(2)-phenylbicyclo[2.2.1]heptane-2(3)-carboxylate,
di(5-chloro-6-hydroxyiminobicyclo[2.2.1]heptane-2(3)-methyl)-oxalate,
di(5-chloro-6-hydroxyiminobicyclo[2.2.1]heptane-2(3)-methyl) terephthalate,
p-phenylene di(5-chloro-6-hydroxyimino-2(3)-methylbicyclo[2.2.1]heptane-2'(3')-carboxylate),
diethylene glycol di(5-chloro-6-hydroxyiminobicyclo-[2.2.1]heptane-2(3)-carboxylate),
di(5-chloro-6-hydroxyiminobicyclo[2.2.1]heptane-2(3)-methyl)ketone,
5-chloro-6-hydroximinobicyclo[2.2.1]heptan-2(3)-yl 5-chloro-6-hydroxyiminobicyclo[2.2.1]heptane-2(3)-carbothiolate,
di(5-chloro-6-hydroxyiminobicyclo[2.2.1]heptane-2(3)-methyl) thione,
5-chloro-6-hydroxyiminobicyclo[2.2.1]heptane-2(3)-methyl[5-chloro-6-hydroxyiminobicyclo-[2.2.1]heptane-2(3)]-thiolacetate,
di(5-chloro-6-hydroxyiminobicyclo[2.2.1]heptan-2(3)-yl) disulfide,
di(5-chloro-6-hydroxyiminobicyclo[2.2.1]heptan-2(3)-yl) sulfoxide,
di(5-chloro-6-hydroxyiminobicyclo[2.2.1]heptan-2(3)-yl) sulfide,
ethylene di[(5-chloro-6-hydroxyiminobicyclo[2.2.1]-heptane-2(3)-)acetate],
5-chloro-6-hydroxyimino-2(3)-phenylbicyclo[2.2.1] heptane-2'(3')-methyl 5-chloro-6-hydroxyimino-2(3)-phenylbicyclo[2.2.1]heptane-2'(3')-carboxylate,
di(5-chloro-6-hydroxyimino-3(2)-propylbicyclo[2.2.1] heptane-2(3)-)methyl sulfone,
di(3(2)-butyl-5-chloro-6-hydroxyiminobicyclo[2.2.1] heptane-2(3)-)methyl sulfide,
di(3(2)-benzyl-5-chloro-6-hydroxyiminobicyclo[2.2.1] heptane-2(3)-)methyl succinate,
di-2-(5-chloro-6-hydroxyimino-3(2)-O-tolylbicyclo [2.2.1]heptane-2(3)-)ethyl ether,
5-chloro-3(2)-ethyl-6-hydroxyimino-2(3)-methyl-bicyclo[2.2.1]heptane-2'(3')-methyl 5-chloro-3(2)-ethyl-6-hydroxyimino-2(3)-methyl-bicyclo [2.2.1]heptane-2'(3')-carboxylate, and the like.

Included among the chloro oxime products of the invention are those derived from the tetracyclo[6.2.1$^{1,8}$.1$^{3,6}$0$^{2,7}$]-4,9-dodecadienes which are represented by Formula VI:

(VI) 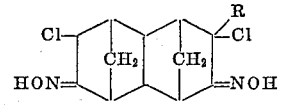

wherein R is hydrogen or an alkyl or aryl radical having from one to eight carbon atoms.

The following compounds are illustrative of the chloro oxime products of the invention which are derived from the tetracyclo[6.2.1$^{1,8}$.1$^{3,6}$.0$^{2,7}$]-4,9-dodecadienes:

4,10(9)-dichloro-5,9(10)-dihydroxyiminotetracyclo-[6.2.1$^{1,8}$.1$^{3,6}$.0$^{2,7}$]dodecane,
4-methyl-4,10(9)-dichloro-5,9(10)-dihydroxyimino-tetracyclo[6.2.1$^{1,8}$.1$^{3,6}$.0$^{2,7}$]dodecane,
4-ethyl-4,10(9)-dichloro-5,9(10)-dihydroxyimino-tetracyclo[6.2.1$^{1,8}$.1$^{3,6}$.0$^{27}$]dodecane,
4-phenyl-4,10(9)-dichloro-5,9(10)-dihydroxyimino-tetracyclo[6.2.1$^{1,8}$.1$^{3,6}$.0$^{2,7}$]dodecane,
4-tolyl-4,10(9)-dichloro-5,9(10)-dihydroxyimino-tetracyclo[6.2.1$^{1,8}$.1$^{3,6}$.0$^{2,7}$]dodecane,
4-xylyl-4,10(9)-dichloro-5,9(10)-dihydroxyimino-tetracyclo[6.2.1$^{1,8}$.1$^{3,6}$.0$^{2,7}$]dodecane, 4-propyl-4,10(9)-dichloro-5,9(10)-dihydroxyimino-
tetracyclo[6.2.1$^{1,8}$.1$^{3,6}$.0$^{2,7}$]dodecane,
4-pentyl-4,10(9)-dichloro-5,9(10)-dihydroxyimino-
tetracyclo[6.2.1$^{1,8}$.1$^{3,6}$.0$^{2,7}$]dodecane,
4-heptyl-4,10(9)-dichloro-5,9(10)-dihydroxyimino-
tetracyclo[6.2.1$^{1,8}$.1$^{3,6}$.0$^{2,7}$]dodecane,
4-octyl-4,10(9)-dichloro-5,9(10)-dihydroxyimino-
tetracyclo[6.2.1$^{1,8}$.1$^{3,6}$.0$^{2,7}$]dodecane,
4-benzyl-4,10(9)-dichloro-5,9(10)-dihydroxyimino-
tetracyclo [6.2.1$^{1,8}$.1$^{3,6}$.0$^{2,7}$]dodecane, and the like Other chloro oximes which are contemplated by the invention include glycerol tri(5-chloro-6-hydroxyimino-bicyclo[2.2.1]heptane - 2(3)-carboxylate), pentaerythritol tetra (5 - chloro - 6 - hydroxyiminobicyclo [2.2.1]heptane 2(3)-carboxylate), tri(5 - chloro-6-hydroxyliminobicyclo-[2.2.1]heptane-2(3)-methyl)1,3,5 - benzenetricarboxylate, and the like.

The preferred chloro oximes are 5-chloro-6-hydroxy-iminobicyclo[2.2.1]heptane-2(3)-methyl 5 - chloro - 6-hydroxyiminobicyclo[2.2.1]heptane-2(3)-carboxylate and di(5-chloro - 6 - hydroxyiminobicyclo[2.2.1]heptane-2(3)-yl)sulfone.

The nitrosochlorides and chloro oximes of the invention have wide utility as chemical intermediates. For example, they can be reacted with ammonia and amines to give the corresponding diamino compounds which are useful for instance, as hardeners for epoxide resins.

The following examples are illustrative of the invention.

EXAMPLE 1

Bicyclo[2.2.1]-5-heptene-2-methyl bicyclo[2.2.1]-5-heptene-2-carboxylate dinitrosochloride A solution of 45 grams (0.184 mole) of bicyclo[2.2.1]-5 - heptene - 2 - methylbicyclo[2.2.1]-5-heptene-2-carboxylate in 400 ml. of pentane was cooled to 5° C. and stirred while adding 0.184 mole (8.5 ml. at −30° C.) of nitrosyl chloride over a 20-minute period at 4–5° C. Stirring was continued for 50 minutes after completing the nitrosyl chloride feed and the resulting while solid product filtered off, washed with pentane, and dried to give 37.3 grams of material, M.P. 130–135° C.

It was then observed that addition of nitrosyl chloride to a small sample of the filtrate from above caused more solid to precipitate. The filtrate was returned to the reaction flask and, with stirring and cooling (4–5° C.), an additional 0.184 mole (8.5 ml. at −30° C.) of nitrosyl chloride added over 17 minutes. The reaction mixture was stirred for 46 min. following the addition period and the precipitate collected, washed and dried to give 20.8 grams of white solid, M.P. 130–135° C. The two batches of product, M.P. 130–135° C., were combined and analyzed for nitrogen with the following result.

Calculated for C$_{16}$H$_{20}$NO$_3$Cl (single NOCl addition): N=4.52.

Calculated for C$_{16}$H$_{20}$N$_2$O$_4$Cl$_2$ (double NOCl addition): N=7.47.

Found for product, M.P. 130–135°: N=7.65.

Upon standing, the filtrate from the reaction yielded a second crop of crude product, weight 4.3 grams, M.P. 120–122° C. It contained 7.42 percent nitrogen and was, therefore, also the dinitrosochloride. The total yield of the dinitrosochloride was 64.2 grams or 90.3 percent of the theoretical.

Attempts were made to recrystallize the crop of M.P. 130–135° C. from ethyl acetate, ethanol, toluene and acetonitrile, but without success. The product was washed with cold (0–5° C.) methanol and dried to give a nearly white product, M.P. 140–142° C. with 90.4 percent recovery, having the following analysis:

Analysis.—Calculated for C$_{16}$H$_{20}$N$_2$O$_4$Cl$_2$: C, 51.21; H, 5.37; N, 7.47. Found: C, 51.18; H, 5.70; N, 7.13.

EXAMPLE 2

5 - chloro - 6 - hydroxyiminobicyclo[2.2.1]heptane-2(3)-methyl 5-chloro-6-hydroxyiminobicyclo[2.2.1]heptane-2(3)-carboxylate A solution of 30.0 grams of bicyclo[2.2.1]-5-heptene-2-methyl bicyclo [2.2.1]-5-heptene-2-carboxylate dinitroso chloride in 300 ml. of N,N'-dimethylformamide was heated at 110–120° C. for a 3-minute period, during which time the green solution turned yellow-green and finally yellow, indicating complete transformation of the nitroso function to the oxime group. The reaction solution was evaporated under reduced pressure to give 34.1 grams of dark sirupy material. This was dissolved in 500 ml. of ethyl ether and the solution allowed to stand, after which time it was filtered. The filtrate was then diluted with an equal volume of pentane, treated with Darco and again filtered. The filtrate was evaporated under reduced pressure to give 23.2 grams (77.4 percent of the theoretical) of the dichloro dioxime product.

Analysis.—Calculated for C$_{16}$H$_{20}$N$_2$O$_4$Cl$_2$: C, 51.21; H, 5.37; N, 7.47. Found: C, 51.03; H, 6.33; N, 7.86.

EXAMPLE 3

Di(bicyclo[2.2.1]-5-hepten-2-yl) sulfone dinitrosochloride

To a stirred solution of 10.6 grams (0.0424 mole) of di(bicyclo[2.2.1]-5-hepten-2-yl) sulfone in 200 ml. of ethyl ether was added 5.57 grams (0.085 mole) of nitrosyl chloride over a 43-minute period with external cooling to maintain a reaction temperature of 2–4.5° C. Stirring at ice temperature was continued for an additional period of 2.37 hours following the feed and the heavy precipitate which formed was filtered off, washed with ethyl ether and dried to give 14.8 grams of crude product, M.P. 160–200° C. The crude material was washed with 200 ml. of ethanol and vacuum dried to give 14.0 grams (87.0 percent yield) of the dinitrosochloride as a white powder, M.P. 160–180° C.

Analysis.—Calculated for C$_{14}$H$_{18}$SO$_4$N$_2$Cl$_2$: C, 44.10; H, 4.76; N, 7.35. Found: C, 43.67; H, 5.28; N, 6.46.

EXAMPLE 4

Di(5-chloro-6-hydroxyiminobicyclo[2.2.1]heptan-2(3)-yl) sulfone

A mixture of 80 g. of di(bicyclo[2.2.1]-5-hepten-2-yl) sulfone dinitrosochloride and 500 ml. of N,N'-dimethylformamide was stirred and heated at 115–117° C. for a period of 27 minutes. The resulting dark brown solution was treated with decolorizing carbon, filtered and the filtrate evaporated under reduced pressure to give 91 g. of a dark sirupy residue. This was dissolved in 100 ml. of dioxane and the solution diluted with 350 ml. of benzene and again treated with activated charcoal and filtered. The filtrate was diluted with 400 ml. of pentane, causing an oil to separate. The latter was taken up in dioxane (after decanting the supernatant liquid) and the dioxane solution evaporated under reduced pressure to 62.1 g. of the dichloro dioxime, M.P. 95–102° C.

Analysis.—Calculated for C$_{14}$H$_{18}$SO$_4$N$_2$Cl$_2$: C, 44.10; H, 4.76; N, 7.35. Found: C, 44.36; H, 5.38; N, 7.44.

An additional 5 grams of product, M.P. 80–110° C., was recovered from the filter cake of the final charcoal treatment by extraction with dioxane. The total yield was 84 percent.

EXAMPLE 5

Tetracyclo[6.2.1$^{1,8}$.1$^{3,6}$.0$^{2,7}$]-4,9-dodecadiene dinitrosochloride

To a stirred solution of 32.0 g. (0.202 mole) of tetracyclo[6.2.1$^{1,8}$.1$^{3,6}$.0$^{2,7}$]-4,9-dodecadiene in 200 ml. of pentane was added 0.404 mole (18.6 ml. at −30° C.) of nitrosyl chloride over a 7-minute period while maintaining a reaction temperature of 5° C. by means of external cooling. Stirring at 5° C. was continued for an additional three-hour period following the feed after which the precipitated crude product was collected and washed with cold pentane. The dried material, weight 58.4 g., M.P. 132° C., was washed with two 250 ml. portions of methanol and again dried to give 46.7 g. of material, M.P. 140° with decomposition. An elemental analysis of this material showed C, 56.80 percent; H, 5.71 percent; N, 8.29 percent, corresponding to an approximately equimolar mixture of the mono- and dinitrosochlorides. The product was then washed with 250 ml. of acetonitrile after which 26.2 g. of insoluble material, M.P. 140° C., remained upon drying. The analysis of the insoluble material showed C, 60.67 percent; H, 6.10 percent; N, 7.34 percent indicating a considerable enrichment of the mononitrosochloride. Evaporation of acetonitrile from the filtrate from the wash left 22 g. of a gummy substance. This was washed with 250 ml. of ethyl ether leaving 10.1 g. of the insoluble solid dinitrosochloride, M.P. 144°.

*Analysis.*—Calculated for $C_{12}H_{14}N_2O_2Cl_2$: C, 49.84; H, 4.88; N, 9.69. Found: C, 51.61; H, 5.35; N, 9.15.

The analysis corresponds to a mixture containing approximately 86 percent of the desired dinitrosochloride and 14 percent of the mononitrosochloride as indicated by the following comparison:

*Analysis.*—Calcd. for 86 percent $C_{12}H_{14}N_2O_2Cl_2$ (dinitrosochloride) and 14 percent $C_{12}H_{14}NOCl$-(mononitrosochloride); C, 51.88; H, 5.08; N, 9.21. Found: C, 51.61; H, 5.35; N, 9.15.

What is claimed is:

1. A compound selected from the group consisting of bicyclo[2.2.1] - 5 - heptene - 2 - methyl bicyclo[2.2.1]-5-heptene - 2 - carboxylate dinitrosochloride; di(bicyclo[2.2.1]-5-hepten-2-yl) sulfone dinitrosochloride; 5-chloro-6-hydroxyiminobicyclo-[2.2.1]heptane - 2(3) - methyl 5-chloro - 6 hydroxyiminobicyclo[2.2.1]heptane - 2(3)-carboxylate; and di(5 - chloro - 6 - hydroxyiminobicyclo[2.2.1]heptane-2(3)-yl) sulfone.

2. Bicyclo[2.2.1]-5-heptene-2-methyl bicyclo[2.2.1]-5-heptene-2-carboxylate dinitrosochloride.

3. Di(bicyclo[2.2.1]-5-hepten-2-yl) sulfone dinitrosochloride.

4. 5 - Chloro - 6 - hydroxyiminobicyclo[2.2.1]heptane-2(3) - methyl 5 - chloro - 6 - hydroxyiminobicyclo[2.2.1]heptane-2(3)-carboxylate.

5. Di(5 - chloro-6-hydroxyiminobicyclo[2.2.1]heptan-2(3)-yl) sulfone.

References Cited by the Examiner

UNITED STATES PATENTS 3,038,927  6/62  Miller _____ 260—468

OTHER REFERENCES

Beckham et al.: Chem. Reviews, vol. 48, pages 369–78 (1951).

Krug et al.: J. Org. Chem., vol. 23, 212–15 (1958).

LORRAINE A. WEINBERGER, *Primary Examiner.*

IRVING MARCUS, DURAL McCUTCHEN, LEON ZITVER, *Examiners.*